Feb. 26, 1929.

L. B. CONANT 1,703,476

PROCESS OF PRODUCING TREADS

Filed July 5, 1924

Inventor,
Leon B. Conant;
By A. B. Upham,
Attorney.

Patented Feb. 26, 1929.

1,703,476

UNITED STATES PATENT OFFICE.

LEON B. CONANT, OF CAMBRIDGE, MASSACHUSETTS, ASSIGNOR, BY MESNE ASSIGNMENTS, TO STANDARD PATENT PROCESS CORPORATION, A CORPORATION OF MASSACHUSETTS.

PROCESS OF PRODUCING TREADS.

Application filed July 5, 1924. Serial No. 724,340.

The object of this invention is the effecting of simple but effective means for vulcanizing a rubber tread to a fibrous member of leather or compressed fibre and the like. In accomplishing this, I provide the fibrous member with numerous holes therein, whereby, upon vulcanizing the rubber composition thereto, the plugs of rubber vulcanized therein will strongly resist any pull tending to separate the tread from the fibrous member.

In addition, I so roughen the inner surfaces of these holes as to still more strongly bind together the tread and fibrous member.

Figure 1:
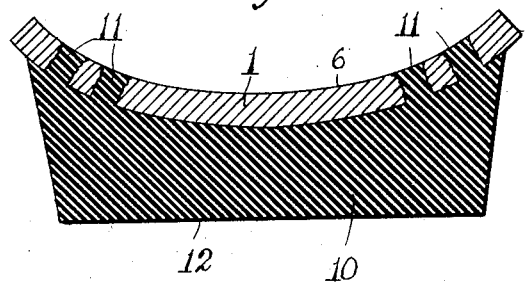
Figure 2:
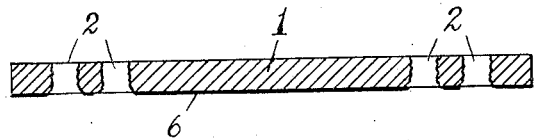
Figure 3:
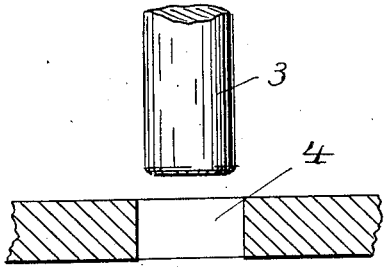
Figure 4:
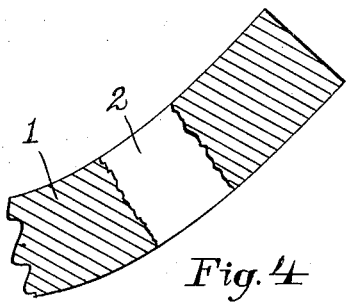

In the drawings forming part of this specification, Fig. 1 is a cross section of a tread embodying my improvements. Fig. 2 is a cross section of a fibrous member previous to the vulcanization of the rubber tread thereto. Fig. 3 is a sectional view of a die and punch such as may be used in perforating the fibrous member. Fig. 4 is a magnified sectional view of a portion of the fibrous member showing rough walled hole.

As shown in Fig. 2, a fibrous member 1 composed of leather or other suitable material, is provided with a plurality of holes 2 formed in any way therein, but preferably punched through it near its marginal portions. As illustrated in Figs. 1 and 2, these holes are disposed in groups of two, while in Fig. 4 one hole alone is shown at a particular location having its interior rough and ragged as illustrated.

Previous to my invention the only way in which leather was perforated was by means of hollow punches forced through the leather upon a wooden block. This method always resulted in forming entirely smooth holes. But I have discovered that by using solid punches 3 co-operating female dies 4, the holes formed thereby were very rough, with the interstices and fibrous projections in the surfaces of the holes most pronounced. Into these scabrous or rough surfaces the rubber composition is intimately injected during the process of vulcanization. This roughness serves to bind the rubber plugs 11 of the tread 10 more securely therein, so that they cannot, without the exertion of considerable force exerted for that special purpose, be withdrawn therefrom and the tread 10 separated from the fibrous member 1.

A suitable biscuit of rubber gum being placed in the mold provided therefor, and the perforate fibrous member 1 placed upon the gum, the combined heat and pressure given in a well known manner to the mold will force the gum into its desired tread form and up into the holes 2, and then vulcanize the same therein.

When the plugs 11 are vulcanized into obliquely disposed holes 2, such obliquity adds very largely to the strength of pull required to separate the tread from the lift, so that this, supplemented by the roughness of the holes, renders the rubber incapable under ordinary conditions of use of becoming detached from the fibrous member.

It is understood that the vulcanized combination of fibrous member and rubber tread is to be attached to a boot or shoe in any well known manner.

What I claim as my invention is:

The process of producing combination treads consisting in providing the fibrous members with holes having scabrous surfaces, and then by means of heat and pressure vulcanizing a rubber tread thereto, the rubber being made to intimately engage said scabrous surfaces and thereby to bind the treads and fibrous members strongly together.

In testimony that I claim the foregoing invention, I have hereunto set my hand this 2nd day of July, 1924.

LEON B. CONANT.